UNITED STATES PATENT OFFICE.

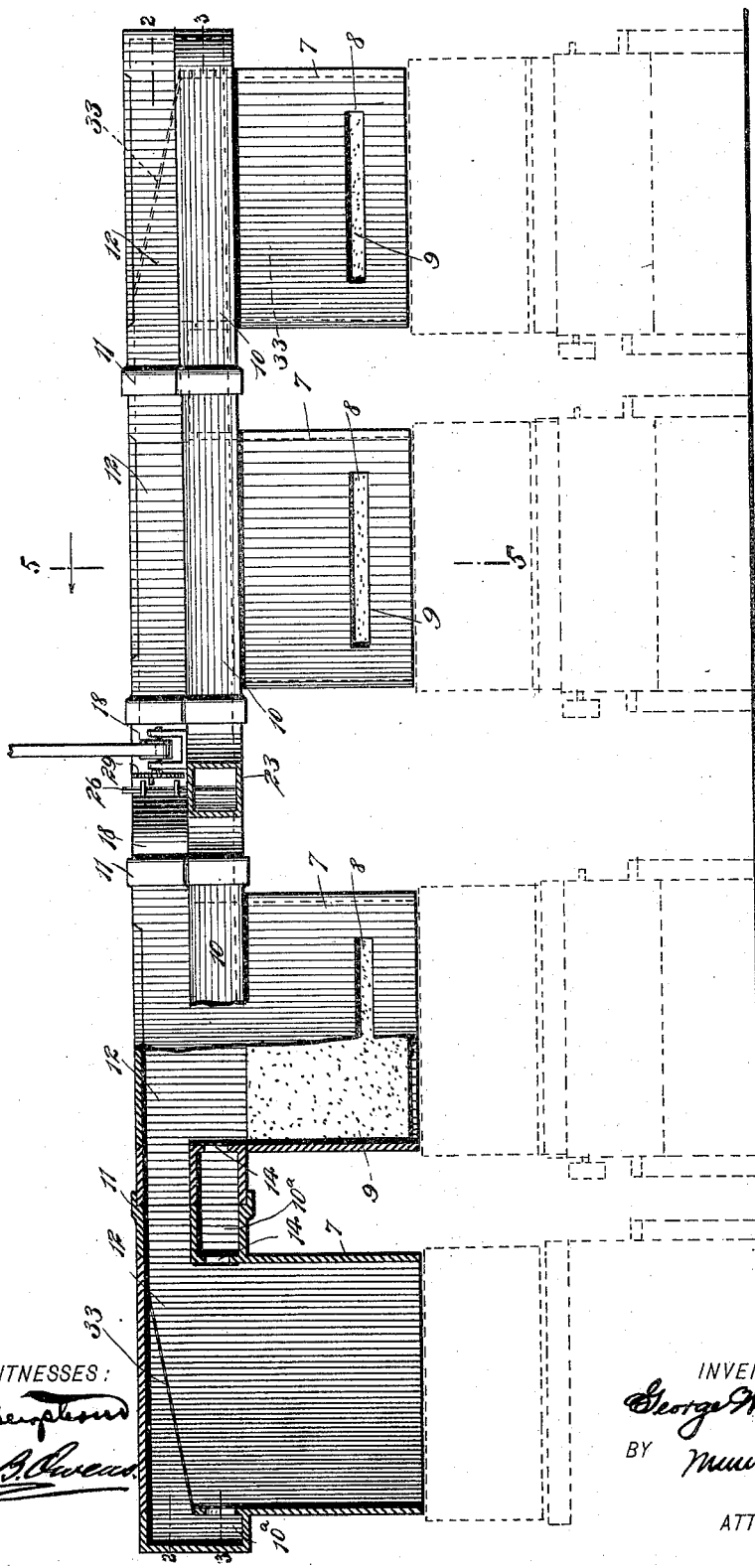

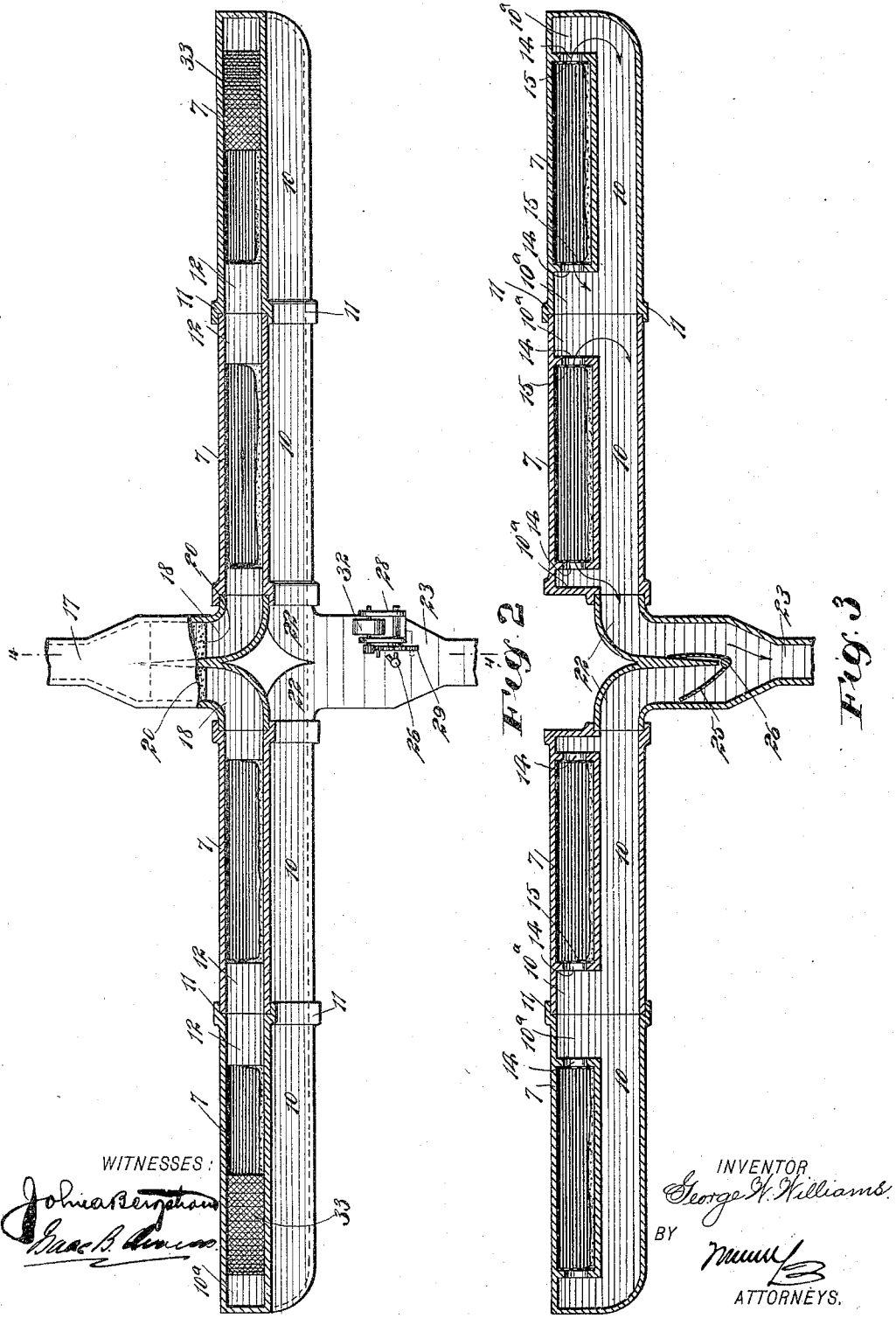

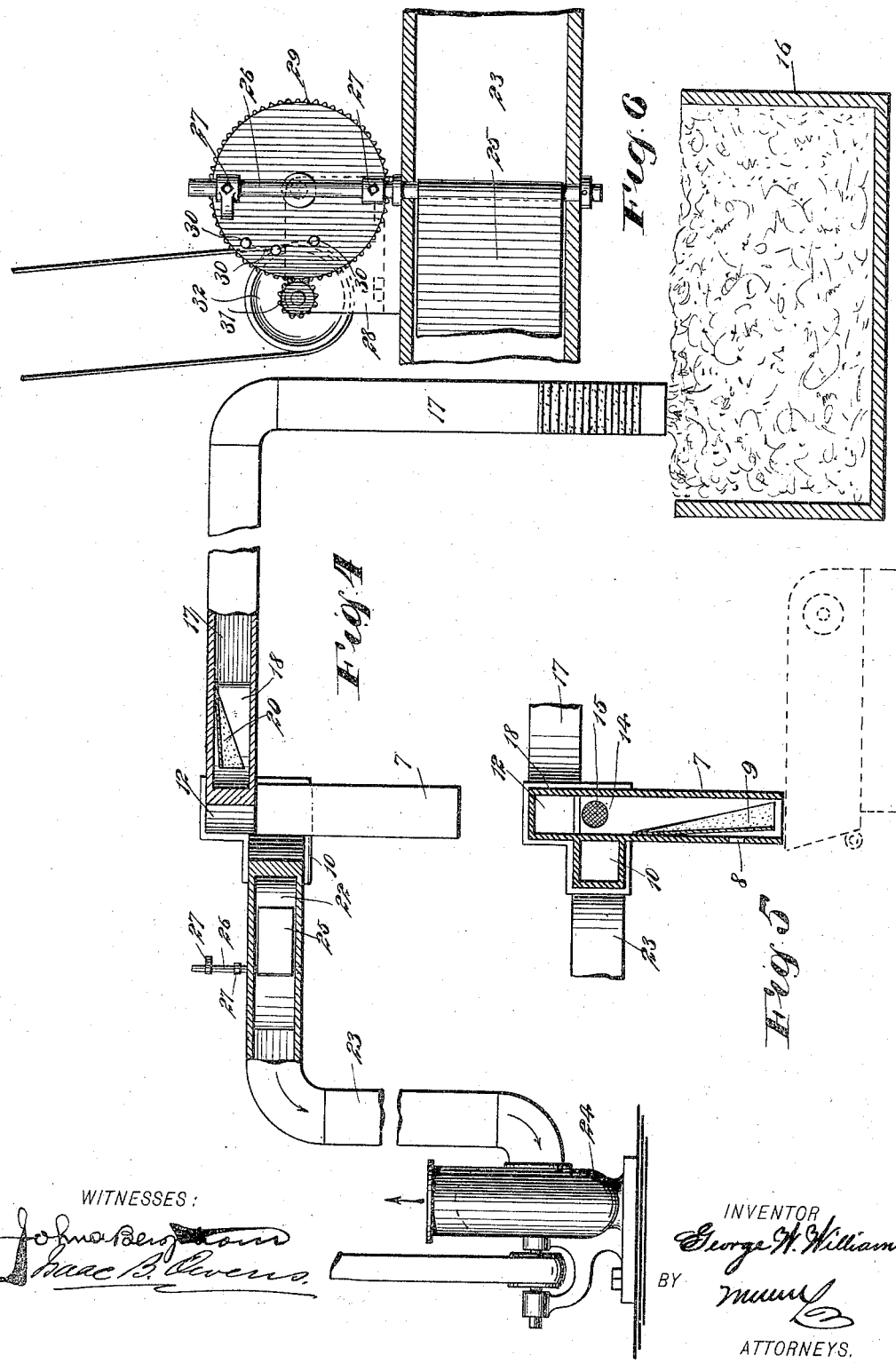

GEORGE W. WILLIAMS, OF WACO, TEXAS, ASSIGNOR TO THE KELLETT-CHATHAM MACHINERY COMPANY, OF SAME PLACE.

COTTON-ELEVATOR.

SPECIFICATION forming part of Letters Patent No. 641,176, dated January 9, 1900.

Application filed March 20, 1899. Serial No. 709,779. (No model.)

*To all whom it may concern:*

Be it known that I, GEORGE W. WILLIAMS, of Waco, in the county of McLennan and State of Texas, have invented a new and Improved Cotton-Elevator, of which the following is a full, clear, and exact description.

This invention relates to that class of cotton-elevators which are operated pneumatically to draw the cotton from the bin or warehouse to the gins; and the object of the invention is to provide means by which to effectively and uniformly distribute the cotton when fed to the gins, thus preventing the cotton from being fed unevenly, which would clog and otherwise retard the action of the gins.

This specification is the disclosure of one form of my invention, while the claims define the actual scope thereof.

Reference is to be had to the accompanying drawings, forming a part of this specification, in which similar characters of reference indicate corresponding parts in all the views.

Figure 1 is a rear view of the apparatus, showing the gins in dotted lines. Fig. 2 is a horizontal section on the line 2 2 in Fig. 1. Fig. 3 is a horizontal section on the line 3 3 in Fig. 1. Fig. 4 is a vertical cross-section on the line 4 4 in Fig. 2. Fig. 5 is a detail cross-section on the line 5 5 in Fig. 1, and Fig. 6 is a fragmentary elevation with parts in section and illustrating the valve and its operating devices by which the current of air in the elevator is controlled.

The drawings illustrate an apparatus adapted to feed a battery of four gins. (See the dotted lines in Fig. 1.) It should be understood that the apparatus may be increased or diminished in capacity according to the requirements of the work in hand. The elevator has for each gin a vertically-disposed box 7, which boxes are located over the respective gins and are open at their lower ends to feed the cotton to the gins. The rear walls of the boxes 7 are provided with horizontally-alined openings 8, which openings are closed by cloth valves 9, contained within the boxes, as best shown in Fig. 5.

The boxes 7 are provided at their upper front portions with air-conduits 10, which conduits register with each other at their ends, so as to form continuous passages, as shown in Fig. 3. For convenience in assembling the several parts of the apparatus the several boxes are made separable and are connected by joints 11, as shown best in Figs. 2 and 3. The boxes 7 are also provided at their upper extremities with cotton-conduits 12, which, like the conduits 10, register with each other to form continuous passages, as shown in Fig. 2. The air passages or conduits of the boxes have at each end of each passage lateral extensions $10^a$, which extend beneath the cotton conduits or passages 12 and communicate with the interiors of the respective boxes by means of openings 14, formed in the inner walls of the boxes. The openings 14 are covered by screens 15 to prevent the cotton from passing into the air-conduits 10. The current of air in the elevator is drawn through the cotton-conduits 12 and down into the upper portions of the boxes 7, carrying with it the cotton, which is thus distributed to the boxes. From the upper portions of the boxes 7 the currents of air pass through the openings 14 into the offsets $10^a$ of the passages 10 and into the passages 10, from whence they pass to the suction-fan that will be fully described hereinafter.

The elevator is divided into two sections.
If the elevator comprises an even number of boxes, each of such divisions will have an equal number of boxes therein; but if the elevator is to feed an uneven number of gins there will be unequal numbers of boxes in the sections of the elevator. The drawings show four gins, and consequently four boxes, and as here shown the two divisions of the elevator have each an equal number of boxes therein. The conduits for conducting the cotton to the elevator and the conduit for creating a blast of air in the elevator are located between the said divisions, and consequently serve to divide the elevator into the two parts referred to. The purpose of this division will be fully described hereinafter. The cotton is taken from the hopper 16 or other source (see Fig. 4) by means of a conductor 17, which passes upwardly and thence horizontally toward the elevator. At the elevator the conductor 17 is formed with two lebows 18, which respectively communicate with the inner ends of the cotton passages or conduits 12 of the two divisions of the elevator, as best shown in Fig. 2. In each of the elbows 18 is arranged an automatic cloth valve 20, which valves serve to close the elbows against currents passing from the cotton-conduits 12 back into the elbows 18 and pipe 17.

The inner ends of the air passage or conduit 10 of the two divisions of the elevator respectively communicate with the elbows 22 of the suction-pipe 23, which passes horizontally and downwardly to the exhaust-fan 24. (See Fig. 4.) According to the principle of my invention the two divisions of the elevator are alternately thrown into and out of action to the end that the cotton drawn into one division will be given time to settle down through the boxes and to fall upon the gin-feeders while the other division is being filled with cotton. In other words, the two divisions of the elevator work alternately. When the cotton is being drawn into one division, the current of air in the other division is shut off and the cotton therein is permitted to fall upon the gin-feeders, and when the cotton has been drawn into the said other division the current of air therein is shut off and the current of air in the other division is turned on. This alternating control of the current of air in the several divisions of the elevator is effected by means of the V-shaped valve 25, which straddles the web dividing the elbows 22 at their juncture with the conductor 23 and which is mounted to rock with a rocking stem 26, journaled in the conductor 23. This stem 26 is provided with two tappet-arms 27, which are adjustable on the stem for purposes that will be hereinafter explained.

Mounted on a pedestal-plate 28, carried on the conductor 23, is a spur-gear 29, provided with a number of pins 30, fixed to the face of the gear adjacent to the stem 26 and at different distances from the center of the gear. The pins 30 are also out of radial alinement with each other, as may be seen in Fig. 6. The gear 29 is driven by a pinion 31, meshing therewith, and carried on the shaft of a drive-pulley 32, actuated from any suitable source of motive power. As the wheel 29 turns one or both of the pins 30 thereon strike the tappet-arms 27 and cause the stem 26 to be rocked, thus throwing the valve 25 back and forth, so as to alternately open and close the elbows 22, and consequently control the two divisions of the elevator, as explained. The purpose of providing the pins 30 and placing these pins out of radial and circumferential alinement with each other is to permit the adjustment of the pins 30 and tappet-arms 27, so that the stem 26 may be rocked at varying intervals. When there is an even number of boxes in each division of the elevator, it is necessary to rock the stem 26 only at regular intervals; but should there be an uneven number of boxes in the divisions of the elevator it will then be necessary to turn the blast into one division for a period longer than in the other division, which is owing to the fact that one division must contain more boxes than the other. Therefore by means of the peculiar arrangement of the pins 30 and the adjustable tappet-arms 27 I can dispose the parts so as to move the valve, so as to turn the current of air into one division for a length of time sufficient for the number of boxes therein, and then turn the current into the other division for a length of time sufficient for the number of boxes in said other division. The purpose of the valves 20 is to close one section of the elevator when the other section is open, and thus to prevent the cotton from being drawn back from the inactive sections into the elbows 18, and thence into the active sections. These valves work alternately to close the elbows of the inactive sections as the valve 25 moves to throw open the active sections.

The exhaust-fan 24 having been started to operate and the conductor 17 being placed in the bin 16, the current of air will flow through the conductor 17 to the elbows 18, from whence it will pass through the cotton conduits or passages 12 of the rear division of the elevator down into the upper parts of the boxes 7. From the boxes 7 the currents of air are divided and pass through the openings 14 into the air-passages 10 by way of the offsets 10ª. From the air-passages 10 the currents of air move inwardly to the elbows 22, and thence out to the exhaust-fan by the conductor 23. The currents of air passing in this manner cause the cotton to be drawn up into the conductor 17 and passed through the elbows 18 into the cotton-passages 12 and down into the boxes 7. The valve 25, working regularly alternately to open and close the elbows 22 of the conductor 23, will throw the sections or divisions of the elbows alternately into action, and the cotton will be drawn into one division of the elevator and then into the next, the cotton in the first division being allowed to settle into the gin-feeders, while the next or other division is being filled, and vice versa. The cloth valves 20 work in unison with the valve 25 and close the elbows 18 of the inactive sections as the valve 25 throws the other active section open. The currents of air passing through the several conductors and passages will cause the cloth valves 9 of the boxes 7 to be drawn inwardly, thus closing the lower ends of the boxes. Therefore when one division of the elevator has a current of air therein and is being filled with cotton the cloth valves 9 of said division are actuated to close the lower ends of the boxes and prevent the existence of counter-currents of air passing upward in the boxes 7. When the currents of air are cut off in the passages 10 and 12 of said division, the valves 9 relax and permit the cotton to settle down through the boxes to the gin-feeders. For the purpose of arresting the progress of the cotton at the outer end of each division of the elevator and for properly disposing the cotton as it enters the gins, I provide in each end box of each division of the elevator a diagonal screen 33, which screens slant upwardly from the outer ends of the boxes in which they are contained, as shown best in Fig. 1.

By means of the arrangement of the air conduits or passages 10 with respect to the cotton-passages 12, as well as the offsets 10ª and the openings 14, I am enabled to produce in the upper portion of each box 7 a cross or parting current which draws the cotton toward each end of the box, and thus spreads the cotton out in a uniform sheet-like mass, causing it to be fed to the gins in such manner. This is one of the essential features of my invention, since it insures the proper distribution of the cotton and avoids a condition which would defeat the effective operation of the elevator.

Having thus described my invention, I claim as new and desire to secure by Letters Patent—

1. A cotton-elevator, having an air-circulating apparatus and a number of boxes forming the body of the elevator, each box having an air-conduit therein, and the air-conduits having lateral extensions at their ends, each box also having a cotton-conduit therein, the cotton-conduit being at the upper portion of the box and communicating at its bottom with the main portion thereof, into which portion of the box the cotton is discharged, the lateral extensions of the air-conduit in each box communicating with the box directly adjacent to corresponding cotton-conduit and near the respective ends thereof, so that currents pass from each end of said cotton-conduit, thus forming cross or parting currents to facilitate the delivery of the cotton into the body of the box.

2. A cotton-elevator, comprising, with the air-circulating apparatus, a box having therein an air-conduit and a cotton-conduit, the cotton-conduit communicating directly with the main portion of the box, into which portion of the box the cotton is discharged, and the air-conduit having a lateral extension at each end, such extension communicating with the box directly adjacent to the cotton-conduit near the respective ends thereof, so that the air drawn into the air-conduit passes from both ends of the cotton-conduit, thereby establishing cross-currents in the box to effectively deliver the cotton into the body of the box.

3. A cotton-elevator, having a number of boxes joined end to end, each box having an air-conduit and a cotton-conduit, the respective conduits of the boxes communicating with each other to form two continuous conduits, the cotton-conduit of each box communicating with the main portion thereof, into which portion the cotton is discharged, and the air-conduit of each box having two extensions communicating with the box directly adjacent to the corresponding cotton-conduit, near the ends of the same, so that the air drawn into the air-conduits will pass from both ends of each cotton-conduit in cross-currents, and means for establishing an air circulation within the elevator.

4. In a cotton-elevator, the combination with a box, of walls forming a cotton-conduit, walls forming an air-conduit arranged below the cotton-conduit, the air-conduit having lateral offsets at its ends, and the walls of the box at the upper portions thereof having openings communicating with the offsets of the air-conduits, thus to produce cross or parting currents within the box.

5. A cotton-elevator, having an air-conduit and a cotton-conduit, the cotton-conduit having an open side communicating with the body of the elevator to discharge the cotton therein, and the air-conduit having communication with the body directly adjacent to the cotton-conduit, such communication being effected at two separate points respectively adjacent to the ends of the opening in the cotton-conduit, whereby the air is drawn through the cotton-conduit into the body of the elevator in cross or parting currents.

GEORGE W. WILLIAMS.

Witnesses:
B. M. CARTER,
W. W. DOWNS.